United States Patent [19]

Rogers, Jr. et al.

[11] Patent Number: 4,540,137
[45] Date of Patent: Sep. 10, 1985

[54] INERTIA RELEASE FOR BELT RETRACTOR WINDING PREVENTION MECHANISM

[75] Inventors: Lloyd W. Rogers, Jr.; Regis V. Pilarski, both of Utica; Thomas B. Blake, Fraser, all of Mich.

[73] Assignee: General Motors Corporation, Detroit, Mich.

[21] Appl. No.: 646,421

[22] Filed: Aug. 31, 1984

[51] Int. Cl.³ .................... A62B 35/02; B65H 75/48
[52] U.S. Cl. ............................... 242/107.6; 242/107.7
[58] Field of Search ............ 242/107.7, 107.6, 107.12, 242/107.4 R, 107.4 E; 280/806–808; 297/474–480

[56] References Cited

U.S. PATENT DOCUMENTS

| | | | |
|---|---|---|---|
| 3,869,098 | 3/1975 | Sprecher | 242/107.4 A |
| 3,973,786 | 8/1976 | Rogers, Jr. | 242/107.7 X |
| 4,153,274 | 5/1979 | Rogers, Jr. et al. | 242/107.7 X |
| 4,285,479 | 8/1981 | Blom | 242/107.6 X |

*Primary Examiner*—John M. Jillions
*Attorney, Agent, or Firm*—Charles E. Leahy

[57] ABSTRACT

In a seat belt retractor winding prevention mechanism, the winding prevention pawl is mounted upon a collapsible support mechanism which is collapsed by the onset of a sensed vehicle deceleration condition so that force imposed on the pawl by the windup spring shifts the pawl against a cam which moves the pawl axially out of engagement with the ratchet teeth carried by the reel to thereby release the winding prevention mechanism so that the windup spring will rewind the belt to a taut condition about the occupant.

3 Claims, 6 Drawing Figures

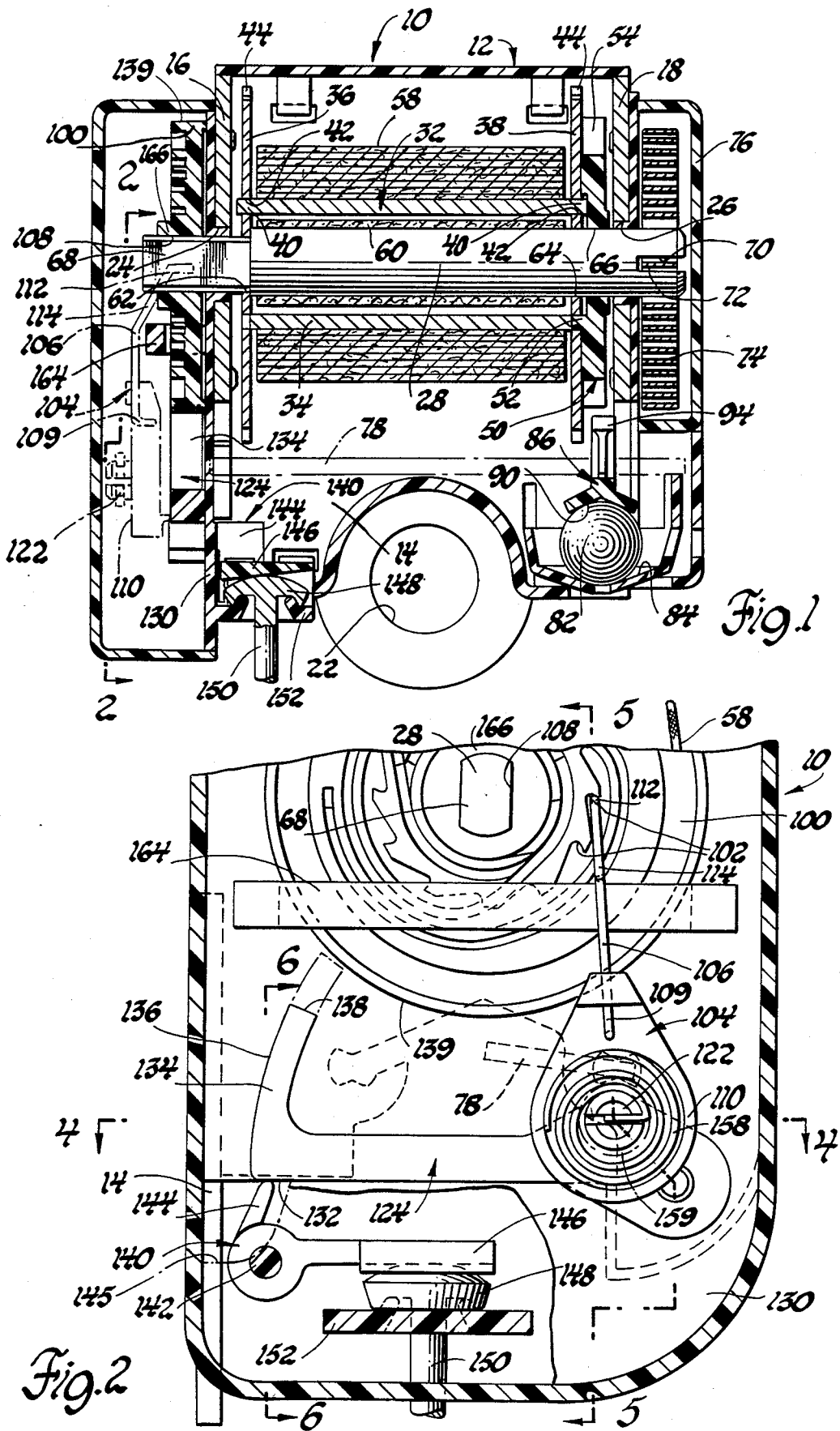

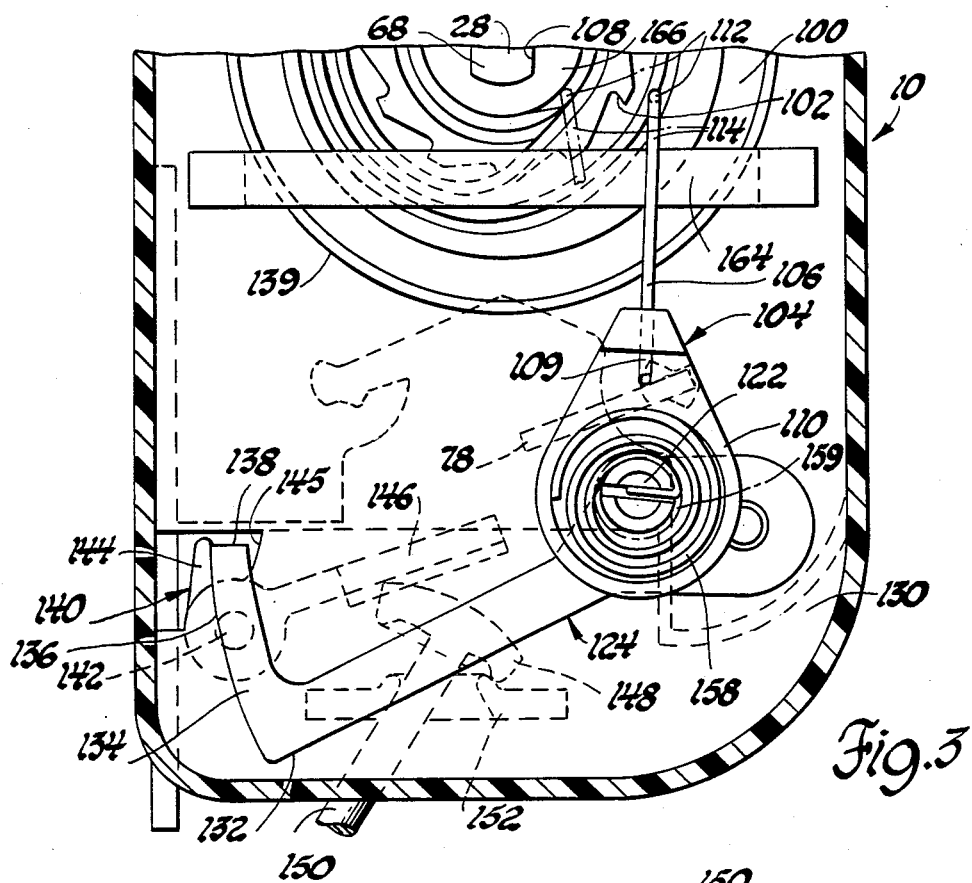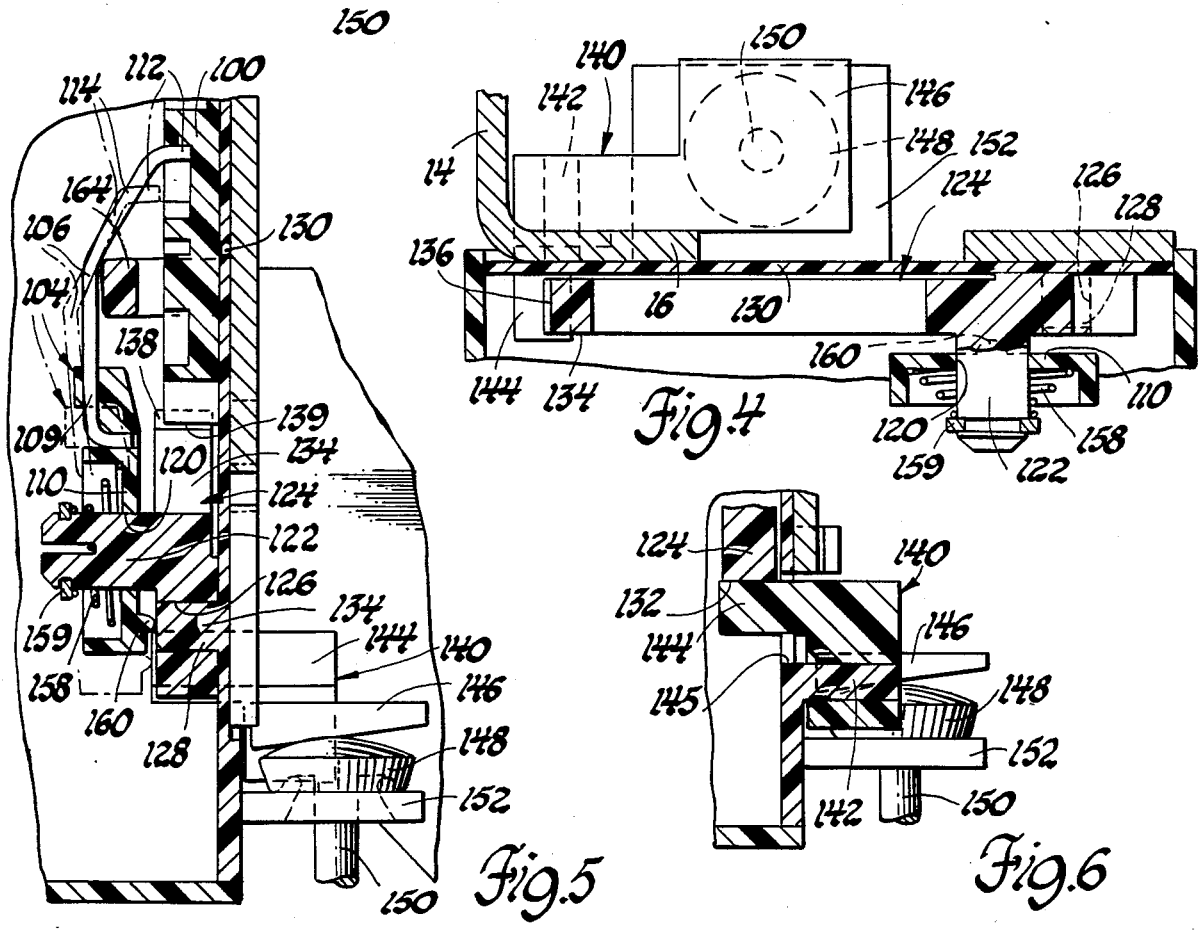

INERTIA RELEASE FOR BELT RETRACTOR WINDING PREVENTION MECHANISM

The invention relates generally to a seat belt retractor for a vehicle occupant restraint system and more particularly provides a winding prevention mechanism which is cancelled and released upon occurrence of predetermined level of vehicle deceleration.

BACKGROUND OF THE INVENTION

Vehicle occupant restraint belt retractors have heretofore been provided with winding prevention mechanisms for selectively relieving the tension on the belt to enhance comfort of the occupant by holding the belt at a slackened length. U.S. Pat. No. 3,869,098 by Raymond G. Sprecher, issued Mar. 4, 1975, discloses a belt retractor in which actuation of the winding prevention feature occurs in response to a predetermined sequence of belt winding and unwinding movement. U.S. Pat. No. 4,153,274 by Lloyd W. Rogers et al, issued May 8, 1979, provides a winding prevention mechanism which is manually actuated.

It is characteristic of the winding prevention mechanism of both the above-captioned patents that the winding prevention feature is cancelled in response to a predetermined extent of belt unwinding so that the winding effort of the windup spring is restored to pull the belt taut about the seated occupant. In a retractor having such a winding prevention mechanism, it is possible for the vehicle occupant to unbuckle the seat belt without having performed the belt unwinding motion necessary to cancel the winding prevention mechanism and the belt will not be retracted onto the reel. U.S. Pat. No. 3,973,786 by Lloyd W. Rogers, issued Aug. 10, 1976, provides an improvement wherein the winding prevention mechanism is automatically cancelled whenever the door is moved from the closed to the open position.

U.S. Pat. No. 4,285,479 by Hubert P. Blom, issued Aug. 25, 1981, provides a further improvement wherein the winding prevention mechanism is cancelled by an inertia sensor upon the occurrence of a sensed condition of vehicle deceleration so that the belt will be rewound to a taut condition about the occupant. In Blom, a cam member is coupled to a pendulum. Upon occurrence of a predetermined level of deceleration, the pendulum pivots and carries the cam member into engagement with a winding prevention pawl to disengage the pawl from ratchet teeth and thereby release the reel for rotation in the belt winding direction by the windup spring. The aforedescribed inertia release device of the Blom patent required a relatively large inertia weight in order to obtain the level of force required to operate the cam member to disengage the pawl from the ratchet teeth.

It would be desirable to provide an improved release mechanism in which a relatively small inertia weight could trigger the release of the winding prevention mechanism and permit the windup spring to pull the belt taut against the occupant.

The present invention provides a further improvement in belt retractor winding prevention mechanisms and more particularly provides for the mounting of a winding prevention pawl upon a collapsible support mechanism which is collapsed by the onset of a sensed vehicle deceleration condition so that force imposed on the pawl by the windup spring shifts the pawl against a cam which moves the pawl axially out of engagement with the ratchet teeth carried by the reel so that the windup spring will rewind the belt to a taut condition about the occupant.

SUMMARY OF THE INVENTION

A seat belt retractor according to the invention includes a windup spring normally biasing the belt reel in the belt winding direction to pull a restraint belt taut about the occupant. A disc carried by the reel has a plurality of circumferentially spaced ratchet teeth. A pawl is mounted by a pivot which permits movement of the pawl both radially and axially of the ratchet teeth and a pawl spring which urges movement of the pawl into engagement with the teeth so that the belt is held in a slackened condition about the occupant. A collapsible support mechanism for the pawl pivot mount includes a support lever having a first end pivotally mounted on the housing, an intermediate portion which carries the pivotal mount for the pawl, and a second end. A trigger lever supports the second end of the support lever against movement by force imposed on the support lever by the effort of the windup spring when the pawl is engaged with the ratchet teeth. An inertia weight is associated with the trigger lever and acts in response to the occurrence of predetermined level of vehicle deceleration to withdraw the trigger lever from support of the lever so that the pawl and lever are shifted relative the housing by an initial belt winding rotation of the reel. A cam acts between the pawl and the housing and moves the pawl axially out of engagement with the ratchet teeth in response to shifting movement of the pawl to thereby disengage the pawl from the ratchet teeth and enable further belt winding rotation of the reel by the windup spring to pull the belt taut against the seat occupant.

The collapsible support mechanism is automatically reset by the pawl spring. This pawl spring imparts a torque on the support lever in the opposite direction to the force which had previously been imposed on the pawl and support lever by the force of the windup spring and thereby restores the support lever to its original condition of support by the trigger lever. More particularly, the disc which carries the ratchet teeth is preferably of the type having the teeth interposed within a complex of spiral grooves having ramps and gates which function to move the pawl radially and axially upon occurrence of a predetermined sequence of belt winding and unwinding reel rotation in order to selectively engage and disengage the pawl with the circumferentially spaced ratchet teeth. Accordingly, the end of the pawl reacts against the wall of the groove so that the pawl spring acting between the pawl and the support lever imparts a torque on the support lever in the direction to reset the support lever and the pawl.

Accordingly the object, feature and advantage of the invention resides in the mounting of a winding prevention pawl upon a support mechanism which is collapsed by an inertia sensor to permit shifting movement of the pawl by the force imposed thereon by the effort of the windup spring and thereby carry the pawl into coaction with a cam adapted to move the pawl axially out of engagement with the ratchet teeth to release the reel for windup spring rotation to pull the belt taut about the seated occupant.

A further object, feature and advantage of the invention resides in the mounting of a winding prevention pawl upon a collapsible structure which is collapsed by relatively low level force provided by an inertia sensor and in which the collapse of the support structure initiates a shifting movement of the pawl by the force imposed thereon by the reel windup spring so that the windup spring provides the relatively large force effort required to effectively disengage the pawl from the reel ratchet teeth.

A further object, feature and advantage of the invention resides in the provision of an inertia collapsible support mechanism for a winding prevention pawl incorporating spring means and a geometrical configuration by which the collapsible support structure is automatically restored to its normal pawl supporting position subsequent to having rewound the belt to a taut condition about the occupant.

A further object, feature and advantage of the invention resides in the provision of the pivotal mount for a winding prevention pawl upon a lever supported by a pendulum operated trigger by which the onset of vehicle deceleration causes the pendulum to actuate the trigger and thereby withdraw support from the lever so that the force imposed on the pawl by the reel windup spring pivots the lever away from the reel and shifts the pawl into contact with a cam surface provided on the retractor housing which in turn pivots the pawl out of engagement with the reel ratchet teeth to fully release the winding prevention mechanism and enable windup of the belt to a taut condition about the seated occupant.

DESCRIPTION OF THE DRAWINGS

These and other features, objects and advantages of the invention will become apparent upon consideration of the specification and the appended drawings in which:

FIG. 1 is a front elevation view of a seat belt retractor according to the invention;

FIG. 2 is a view taken in the direction of arrows 2—2 of FIG. 1 and showing the winding prevention pawl engaged with ratchet teeth on the reel to prevent belt winding rotation and thereby hold the belt in a slackened relation about the seat occupant;

FIG. 3 is a view similar to FIG. 2 but showing the condition of the retractor subsequent to a vehicle deceleration having tilted the pendulum, actuated the trigger, and thereby enabled pivotal movement of the pawl support lever and the pawl such that the pawl has engaged with the cam to release the pawl from the ratchet teeth;

FIG. 4 is a sectional view taken in the direction of arrows 4—4 of FIG. 2;

FIG. 5 is a sectional view taken in the direction of arrows 5—5 of FIG. 2 in which the solid line indicated position of the pawl corresponds with the pawl engaged position of FIG. 2 and the phantom line indicated position of pawl corresponds with the pawl released position of FIG. 3;

FIG. 6 is a sectional view taken in the direction of arrows 6—6 of FIG. 2.

DESCRIPTION OF THE PREFERRED EMBODIMENT

Referring to FIG. 1 there is shown a seat belt retractor according to the invention and having a frame 12 including a base wall 14 and laterally spaced apart sidewalls 16 and 18. The base wall 14 has an apertured boss 22 for receiving a bolt to attach the base wall 14 to the vehicle body. The sidewalls 16 and 18 have aligned apertures 24 and 26 for receiving and rotatably mounting a reel shaft 28.

As best seen in FIG. 1 a belt reel, indicated generally at 32, includes a spool 34 comprised of a C-shaped metal stamping. A pair of sprockets 36 and 38 are attached to the ends of the spool 34 by a plurality of stakes 40 which extend through aligned slots 42 in the sprockets. The sprockets 36 and 38 have a plurality of circumferentially spaced sprocket teeth 44 which face in the belt unwinding direction of reel rotation. The gear 50 of molded plastic has a plurality of projections 52 which extend into mating holes in the sprocket 38 so that the gear 56 rotates in unison with the reel 32. The gear 50 has gear teeth 54 which face in the belt unwinding direction.

A restraint belt 58 has an end loop 60 which enters the spool 34 and encircles the reel shaft 28 so that the belt 58 is securely anchored to the reel 32 and is unwound therefrom during rotation of the reel in the belt unwinding direction. Sprockets 36 and 38 have central apertures 62 and 64 which receive the reel shaft 28. The gear 56 has a similar central aperture 66. The aperture 62 is configured to nonrotatably receive a necked down flattened end 68 of the reel shaft 28 so that the reel shaft 28 rotates in unison with the reel 32.

The right hand end of the reel shaft 28 projects outwardly through the housing sidewall 18 and has a slot 70 which receives the inner end 72 of a spiral windup spring 74. The outer end of the spring 74 is suitably anchored upon a spring cover 76 which is in turn attached to the frame sidewall 18. The spring urges rotation of the reel 32 in the belt winding clockwise direction as viewed in FIG. 2.

A lock bar 78 has its ends pivotally mounted in mounting slots provided in the frame sidewalls 16 and 18 for movement into locking engagement with the sprocket teeth 44 to lock the reel 32 against belt unwinding rotation. A vehicle inertia sensing mechanism is provided for operating the lock bar 78 and includes a ball 82 which seats in a cup 84. A pawl 86 is pivotally mounted on the frame sidewall 18 and includes an underside 90 which rests upon the ball 82 and a pawl tooth 94 which is poised to engage with the gear tooth 54, of the gear 50 carried by the reel when the ball 82 rolls in the cup 84 under the stimulus of a vehicle deceleration condition. When the pawl tooth 94 engages with the gear tooth 54 a belt unwinding rotation of the reel 32 induced by initiation of unwinding of the belt of the reel as the occupant torso moves forward relative the seat, causes the gear tooth 54 to further pivot the pawl 86 to such an extent that the pawl 86 in turn raises the lock bar 79 into engagement with the sprocket teeth 44 to lock the belt reel against the belt unwinding rotation.

A winding prevention mechanism acts between the reel 32 and the sidewall 16 to selectively lock the reel 32 against belt winding rotation by the effort of the windup spring 74 so that the belt 58 is held in a slackened condition to enhance the comfort of the seated occupant. In general, the winding prevent mechanism includes a molded plastic control disc 100 which is carried by the reel shaft 28 and has a plurality of ratchet teeth 102 which are selectively engageable by a pawl 104 to block the reel 32 against rotation in the belt winding direction by the windup spring 74. More particularly, as best seen in FIGS. 1 and 2 the control disc 100 has a central noncircular aperture 108 which fits over the flattened end 66 of the reel shaft 28 so that the control disc 100 rotates in unison with the reel shaft 28. The control disc 100 has a series of concentric and spiral grooves which are connected by ramps and gates in a manner known to move the pawl 104 radially and axially upon occurrence of a predetermined sequence of belt winding and unwinding reel rotation in order to selectively engage and disengage the pawl 104 with the ratchet teeth 102. U.S. Pat. No. 4,002,311 by Robert C. Fisher et al, issued Jan. 11, 1977, is incorporated herein by reference and provides a further disclosure of the manner in which the control disc 100 functions to operate the pawl 104.

As best seen by reference to FIGS. 2, 3, and 4, the pawl 104 includes a pawl wire 106 having a base end 108 which is anchored upon a plastic base 110, and a pawl end 112 which projects into the groove of the control disc 100 and is integrally connected with the base portion 100 of the pawl wire 106 by an angled cam portion 114. The pawl base 110 has a central aperture 120 which seats over a pivot pin 122 which projects from a support lever 124. The support lever 125 has an aperture 126 which seats upon a pivot pin 128 molded integrally with a molded plastic support base 130 which overlies the frame sidewall 16. As best seen in FIG. 2, the support lever has an underside 132 and also carries a cam arm 134 having an arcuate face 136 with an end abutment 138. The support lever 124 pivots between its normal position of FIG. 2, a phantom line indicated position of FIG. 2, and a collapsed position of FIG. 3. The phantom line indicated position is defined by the engagement of the end abutment 138 with the outer periphery 139 of the control disc 100.

As best seen in FIGS. 2, 4, and 6, the support lever 124 is normally held against downward movement from its normal position of FIG. 2 by a trigger lever 140 which is pivotally mounted on a pivot pin 142 extending from the support base 130. The trigger lever 140 includes an arm 144 which reaches laterally through a window 145 in the support wall upwardly to engage the underside 132 of the support lever 124. The trigger lever 140 also includes a leg 146 which reaches laterally from the pivot pin 142 and rests upon the head 148 of a pendulum 150 which is mounted upon a pendulum platform 152 molded integral with the support base 130.

As best seen in FIGS. 2, 3 and 5, a spiral compression pawl spring 158 encircles the pivot pin 122 and acts between a snap ring 159 on the the pivot pin 122 and the pawl base 110 in a manner to urge the pawl base 110 and the pawl 104 mounted thereon axially rightward as viewed in FIG. 5 into engagement with the control disc 100. The spiral compression pawl spring 158 also imparts a torque to the pawl base 110 in the counterclockwise direction a viewed in FIG. 3 to urge pivoting of the pawl 104 radially inward toward the reel shaft 28 and simultaneously urge pivoting of the support lever 124 in the clockwise direction to the phantom line position of FIG. 2 in which the end abutment 138 engages the outer periphery 139 of the control disc 100. The pawl base 110 includes a boss 160 which bears upon the pivot pin 128 of the support base 130 to provide a fulcrum for the pivoting movement of the pawl 104 axially of the control disc 100.

OPERATION

When a vehicle occupant enters the seat and buckles the seat belt in a restraining position, the winding prevention mechanism may be engaged to establish a slackened condition of the belt about the occupant. Referring to FIG. 2, it will be understood that a slight extension of belt from the reel subsequent to the belt having been unwound from the reel, buckled and then allowed to rewind about the occupant, will have caused the spiral groove, ramps and gates of the control disc 100 to have established the pawl 104 at the position of FIG. 2 in which the pawl end 112 is engaged with one of the ratchet teeth 102. Accordingly the pawl 104 resists further rotation of the reel 32 in the belt winding clockwise direction of rotation to hold the belt at a slackened length about the occupant. However, the windup spring 74 continues to urge winding rotation and thus imposes a downwardly acting force upon the pawl 104 and through the pivot pin 122 onto the support lever 124. The support lever 124 is in turn supported at its position of FIG. 2 by the engagement of the underside 132 of support lever 124 on trigger arm 144 of the trigger lever 140.

When the vehicle experiences a deceleration condition, it is desirable that the slack be removed from the belt so that the belt will be taut about the occupant. The onset of the deceleration condition upsets the pendulum 150 which in turn raises the trigger leg 146 of trigger lever 140 so that the trigger arm 144 is pivotally withdrawn from support of the support lever 124 as shown in FIG. 3. Thus, the load imposed on the pawl 104 by the effort of the windup spring 74 will no longer be resisted with the result that the windup spring 74 is permitted to initiate belt rewinding rotation of the reel 32 and thereby shift the pawl 104 downwardly as permitted by rotary movement of the support lever 124 to the collapsed position of FIG. 3. While the support lever 124 is in the collapsed position, the arcuate face 136 of support lever 124 engages the trigger arm 144 to hold the trigger lever 140 in its raised position of FIG. 3.

As best seen in FIGS. 3 and 5, the downward shifting movement of the pawl 104 causes the angled cam portion 114 of the pawl wire 106 to come into contact with a cam bar 164 molded integrally with the support base 130 so that the end 112 of the pawl wire 106 is pivoted axially away from the ratchet tooth 102. Thus, the winding prevention mechanism is released and the windup spring 74 is permitted to rewind the belt taut about the occupant. Upon axial movement of the pawl 104 out of engagement with the ratchet tooth 102, the pawl spring 158 pivots the pawl 104 counterclockwise relative to its pivot pin 122 to the phantom line indicated position of FIG. 3 in which the pawl end 112 comes into engagement with a central shoulder portion 166 of the control disc 100.

As soon as the pawl end 112 engages the central shoulder 166, the torque of the pawl spring 158 imparts a moment on the support lever 124 in the clockwise direction to pivotally raise the support lever 124 to its phantom line position of FIG. 2 in which the end abutment 138 engages the outer periphery of the control disc 100. Then, the trigger lever 140 is permitted to return to its normal position of FIG. 2 so that the pawl arm 144 is again poised for subsequent supporting engagement with the underside of the support lever 124 to resist the effort of the windup spring when the pawl 104 is again engaged with a ratchet tooth 102.

Thus it is seen that the invention provides a collapsible support structure for the winding prevention pawl and an inertia triggered device for automatically collapsing the support structure with the onset of a vehicle deceleration condition. The shifting movement of the pawl upon collapse of the support structure carries the pawl into coaction with a cam surface which axially displaces the pawl out of engagement with the teeth on the reel so that the windup spring can rotate the reel in the belt winding direction to pull the belt taut about the occupant. Furthermore, it is seen that the collapsible support structure and winding prevention mechanism automatically reset when the deceleration condition is terminated. More particularly, as soon as the pawl is disengaged from the ratchet teeth of the disc carried by the reel, the pawl is pivoted radially inward by the pawl spring to engage a shoulder of the disc so that the pawl is stopped against further movement. At that point the effort of the pawl spring imposes a moment upon the support lever which returns the support lever to its normal raised position and gravity returns the trigger to its normal position supporting the lever.

The invention is disclosed herein in terms of the preferred embodiment of the invention in which the collapsible support mechanism comprises a pivoted lever supported by a trigger. It is within the scope of the invention to provide alternate collapsible mechanisms in which the pawl could be otherwise supported on a collapsible structure which might for example slide or shift bodily instead of pivoting as disclosed herein. Furthermore, although the winding prevention pawl herein is disengaged from the ratchet teeth by movement axially of the ratchet teeth it is apparent that the cam means could be employed which would move the pawl slidably out of engagement with the ratchet teeth. Accordingly it will be understood that the scope of the invention is determined by reference to the appended claims and is not limited to the disclosure of the preferred embodiment.

The embodiments of the invention in which an exclusive property or privilege is claimed are defined as follows:

1. A seat belt retractor comprising:
a housing;
a belt reel rotatably mounted on the housing and having ratchet teeth;
a windup spring imposing a force urging rotation of the reel in the belt winding direction to pull the belt taut against a seat occupant;
a pawl movably mounted for selective engagement and disengagement with the ratchet teeth to block belt winding rotation by resisting the force imposed by the windup spring so that the belt is held in a slackened condition about the occupant;
a collapsible support mechanism carrying the pawl to normally support the pawl against movement by force imposed thereon by the effort of the windup spring when the pawl is engaged with the ratchet teeth carried by the reel;
inertia means acting in response to the occurrence of a predetermined level of vehicle deceleration to trigger a collapse of the collapsible support mechanism so that the pawl is shifted relative the housing by the force imposed thereon by the effort of the windup spring; and
means acting to move the pawl out of engagement with the ratchet teeth in response to shifting movement of the pawl to thereby enable further belt winding rotation of the reel by the windup spring to pull the belt taut against the seat occupant.

2. A seat belt retractor comprising:
a housing;
a belt reel rotatably mounted on the housing;
a windup spring urging rotation of the reel in the belt winding direction to pull the belt taut against a seat occupant;
a disc carried by the reel and having a plurality of circumferentially spaced ratchet teeth;
a pawl selectively engageable with the ratchet teeth to block belt winding rotation so that the belt is held in a slackened condition about the occupant;
pawl mounting means including a pivot mounting the pawl for movement both radially and axially of the disc and spring means yieldably urging movement of the pawl slidably and axially into engagement with the teeth;
a lever having a first end pivotally mounted on the housing, an intermediate portion carrying the pawl mounting means and a second end;
trigger means supporting the second end of the lever against movement by force imposed on the lever by the effort of the windup spring when the pawl is engaged with the ratchet teeth carried by the disc;
inertia means associated with the trigger means and acting in response to the occurrence of a predetermined level of vehicle deceleration to withdraw the trigger means from support of the lever second end so that the pawl and lever are shifted relative the housing by an initial increment of belt winding rotating by the windup spring; and
means acting between the pawl and the housing and adapted to move the pawl axially of the disc in response to shifting movement of the pawl and disengage the pawl from the ratchet teeth to enable further belt winding rotation of the reel by the windup spring to pull the belt taut against the seat occupant.

3. A seat belt retractor comprising:
a housing;
a belt reel rotatably mounted on the housing and having a plurality of circumferentially spaced ratchet teeth;
a windup spring imposing force urging rotation of the reel in the belt winding direction to pull the belt taut against a seat occupant;
a pawl selectively engageable with the ratchet teeth to block belt winding rotation by resisting the force imposed by the windup spring so that the belt is held in a slackened condition about the occupant;
a lever pivotally mounted on the housing;
pawl mounting means mounting the pawl on the lever and including a pivot mounting the pawl for movement both radially and axially of the ratchet teeth and pawl spring means acting between the pawl and the lever to yieldably urge movement of the pawl axially into engagement with the teeth and impart a rotary torque on the pawl urging pawl rotary movement into engagement with the ratchet teeth and impart a rotary torque on the lever urging rotation of the lever in the opposite direction to a normal position;
trigger means supporting the lever against movement by force imposed on the lever by the effort of the windup spring when the pawl is engaged with the ratchet teeth carried by the reel;
inertia means associated with the trigger means and acting in response to the occurrence of a predetermined level of vehicle deceleration to withdraw the trigger means from support of the lever so that the pawl and lever are shifted relative the housing by the force of the windup spring initiating belt winding rotation of the reel; and
means acting to move the pawl axially out of engagement with the ratchet teeth in response to said shifting movement to enable further belt winding rotation of the reel by the windup spring to pull the belt taut against the seat occupant while the rotary torque of the pawl spring means is simultaneously allowed to rotate the pawl in the opposite direction for subsequent support in the normal lever position by the trigger means.

* * * * *